United States Patent
Sato et al.

(10) Patent No.: US 7,402,275 B2
(45) Date of Patent: Jul. 22, 2008

(54) POWDER BODY MELTING BURNER

(75) Inventors: Wataru Sato, Tokai (JP); Toshiki Watanabe, Tokai (JP); Tetsuo Okamoto, Tokai (JP)

(73) Assignees: Daido Tokushuko Kabushiki Kaisha, Aichi (JP); Daido Ecomet Kabushiki Kaisha, Aichi (JP)

( * ) Notice: Subject to any disclaimer, the term of this patent is extended or adjusted under 35 U.S.C. 154(b) by 0 days.

(21) Appl. No.: 11/286,675

(22) Filed: Nov. 23, 2005

(65) Prior Publication Data

US 2006/0108724 A1    May 25, 2006

(30) Foreign Application Priority Data

Nov. 25, 2004    (JP)    ............... 2004-341058

(51) Int. Cl.
C21C 7/00    (2006.01)
(52) U.S. Cl. ............ 266/225; 266/265; 266/268
(58) Field of Classification Search .......... 266/216, 266/217, 225, 265, 268
See application file for complete search history.

(56) References Cited

U.S. PATENT DOCUMENTS

| | | | |
|---|---|---|---|
| 2,920,001 A * | 1/1960 | Smith et al. ............ | 239/132.3 |
| 5,042,964 A | 8/1991 | Gitman et al. | |
| 5,876,483 A * | 3/1999 | Okamoto et al. ............ | 75/582 |
| 5,968,230 A | 10/1999 | Okamoto et al. | |
| 6,558,614 B1 | 5/2003 | Fritz | |
| 2003/0075843 A1 | 4/2003 | Wunsche | |

FOREIGN PATENT DOCUMENTS

| | | |
|---|---|---|
| EP | 1 092 785 | 4/2001 |
| EP | 1 462 717 | 9/2004 |
| JP | 410244187 A * | 9/1998 |
| JP | 411325440 A * | 11/1999 |
| JP | 2000-103656 | 4/2000 |
| JP | 02002139212 A * | 5/2002 |

* cited by examiner

*Primary Examiner*—Scott Kastler
(74) *Attorney, Agent, or Firm*—William L. Androlia; H. Henry Koda

(57) ABSTRACT

A powder body melting burner which injects a powder body, fuel and oxygen into a furnace individually from a burner head and melts the powder body in flames in which the fuel is burned under oxygen support. The burner includes a single powder body injection hole provided in the center of the burner head, a plurality of fuel injection holes disposed at a predetermined central angle in the radial direction centered on the powder body injection hole, a single primary oxygen injection bole provided concentrically which each of the fuel injection holes, a plurality of second oxygen injection holes ranged in large numbers at a predetermined interval so as to enclose each of the powder injection boles and the fuel injection holes with the plurality of secondary oxygen injection holes forming a ring shape as a whole and a cooling chamber provided on the back side of the burner head.

3 Claims, 3 Drawing Sheets

POWDER BODY MELTING BURNER

TECHNICAL FIELD

This invention relates to a powder body melting burner, and more particularly relates to a powder body melting burner used suitably for a melting treatment furnace in which powder particulates or the like made by crushing, for example, an electric furnace dust, a reduction slag, a burned ash and other plastic wastes are melted in high temperature flames and are recovered as a molten slag in a furnace, and to a powder body melting burner used suitably for a melting reduction furnace in which, for example, a powder-granular metal oxide, other metal sulfide or the like is melted in high temperature flames and at the same time the oxygen, sulfur, or the like are separated to recover as a molten metal in a furnace.

PRIOR ART

As the powder body melting burner, for example, there is one described in Japanese Unexamined Patent Publication No. 2000-103656. A powder body melting burner 5 disclosed in this publication, as shown in FIG. 3, includes a fuel supply hole 5a opened in the center of a top surface thereof; a primary oxygen supply slit 5b of a ring shape that is opened on the outside of the fuel supply hole 5a; a dust and reducing-slag supply hole 5d consisting of a plurality of elliptical long-holes that are arranged annularly and opened on the outside of the primary oxygen supply slit 5b; and a secondary oxygen supply hole 5f consisting of a plurality of round holes 5e that are arranged annularly and opened on the outside of the dust and reducing-slag supply holes 5d.

The powder body melting burner 5 according to the conventional art described above, as shown in FIG. 4, is inserted into a powder body melting furnace 6 at right angles, and from the burner head thereof a powder body such as a reducing slag, fuel, and oxygen are injected individually into the furnace. The fuel ignited in the furnace is burned under oxygen support to form high temperature flames, and the powder body is melted in the flames and recovered as a molten slag at the bottom of a furnace body 6a, and moreover, the detoxicated secondary dusts are recovered to the outside of the furnace. The molten slag will be reused in applications of, for example, roadbed materials or the like after having been taken out from the furnace body 6a and having been cooled. (Refer to Japanese Unexamined Patent Publication No. 2000-103656).

SUMMARY OF THE INVENTION

When observing the behavior of the flames inside the furnace in the powder body melting burner 5, the fuel such as heavy oils is supplied from the center of the burner head and formed as flare-shaped flames. Moreover, the powder body is injected from a plurality of long holes 5c arranged annularly on the outside of the fuel supply hole 5a, and is supplied into the flames which have spread in a flare shape.

In this case, although a large portion of the powder body supplied into the flames is melted as described above and is fallen to the bottom of the furnace to be recovered, a part of the supplied powder body (approximately 5 to 8%) will escape to the outside of the flames and be mixed, as unwelded, with an exhaust gas and be exhausted outside the furnace (a carry-over phenomenon). Because this carry-over phenomenon invites the operation loss that the powder body escapes to the outside of the furnace without being melted, the reduction thereof is expected.

Moreover, in the conventional powder body melting burner 5, the length of the flames per fuel supplied into the furnace is long, so it is necessary to design the furnace to be high enough to keep the length of the flames inside the furnace. Thus, there is a drawback that the equipment cost will increase. Moreover, in the case where the height of the furnace is equal, if the length of the flames becomes long, the flames which have hit the molten material at the bottom of the furnace will reach the surrounding furnace wall, and thus there is a drawback that these high temperature flames will accelerate the wear out of the refractory materials of the furnace wall.

Under such circumstances, as the present inventor has investigated in various ways in search for the solutions for the above problem, it has been confirmed that the carry-over phenomenon described above is caused by the fact that because the powder body is supplied from the outside as to enclose the fuel to be injected from the center of the burner head, a part of the powder body that has been supplied to the relatively outside of the flames is spewed out without being accompanied by the flame flow. Accordingly, it has been found that if the powder body is supplied from the center of the burner head in place of the conventional method of supplying the powder body from the outside of the fuel, and if the fuel is supplied from a plurality of places in the outside of the powder body concerned, the above described carry-over phenomenon that the powder body escapes from flames can be suppressed drastically.

Moreover, because it can be conceived that the dominant cause why the length of flames becomes long is that the fuel is supplied from one place, the way of thinking has been changed like the above. Thus, it has been found that if the powder body is supplied from one place in the center of the burner head and if the fuel is supplied from a plurality of places that enclose the powder body concerned, the fuel would be burned in a dispersed state even with the same amount of fuel, and therefore the length of the overall flames can be shortened.

MEANS FOR SOLVING THE PROBLEMS

In order to overcome the problem and to achieve the desired objective suitably, according to an aspect of the present invention a powder body melting burner which injects a powder body, fuel, and oxygen into a furnace individually from a burner head and melts the powder body in flames in which the fuel is burned under the assistance of oxygen, the powder body melting burner comprises:

a single powder body injection hole provided in the center of the burner head;

a plurality of fuel injection holes disposed with a required central angle in the radial direction centering on the powder body injection hole;

a single primary oxygen injection hole provided concentrically with each of the fuel injection holes; and a plurality of secondary oxygen injection holes arranged in large numbers with a predetermined interval so as to enclose each of the powder body injection holes and the fuel injection holes, a plurality of the secondary oxygen injection holes forming a ring shape as a whole.

DESCRIPTION OF THE PREFERRED EMBODIMENT

Next, a powder body melting burner according to the present invention will be described by way of a preferable embodiment with reference to the accompanying drawings. It should be noted that, in this embodiment, assuming heavy oils as the fuel, and moreover, water as the cooling medium used for the burner body and burner head, and moreover, an electric furnace dust, a reducing slag, a burned ash, or the like as the powder body or powder like perticulates. However, the scope of the present invention is not restricted thereto, as a matter of course.

Furthermore, the term "powder body" to be used in the present invention is not restricted to the so-called pure and simple powder-like powder body, but includes grain-like ones and granular ones, and further even a fluid body composed of the so-called collection of chip-like small pieces. Namely, one example of the powder body to be treated with the powder body melting burner according to the present invention includes an electric furnace dust, a reducing slag, a burned ash, or the like to be a slag after having been melted. Moreover, another example includes a powder-granular waste plastic, a shredder dust, a carbonized sludge, or the like to be gasified by combustion. Furthermore, another example includes a powder-granular iron ore, nickel ore, copper ore, molybdenite ore, or the like which exist as a metal oxide, a metal sulfide or a metal hydroxide, a metal carbonation or the like, and which serves as metal by separating the oxygen, the sulfur, the hydroxyl radical, the carbonic acid radical, or the like, respectively.

Figure 1:
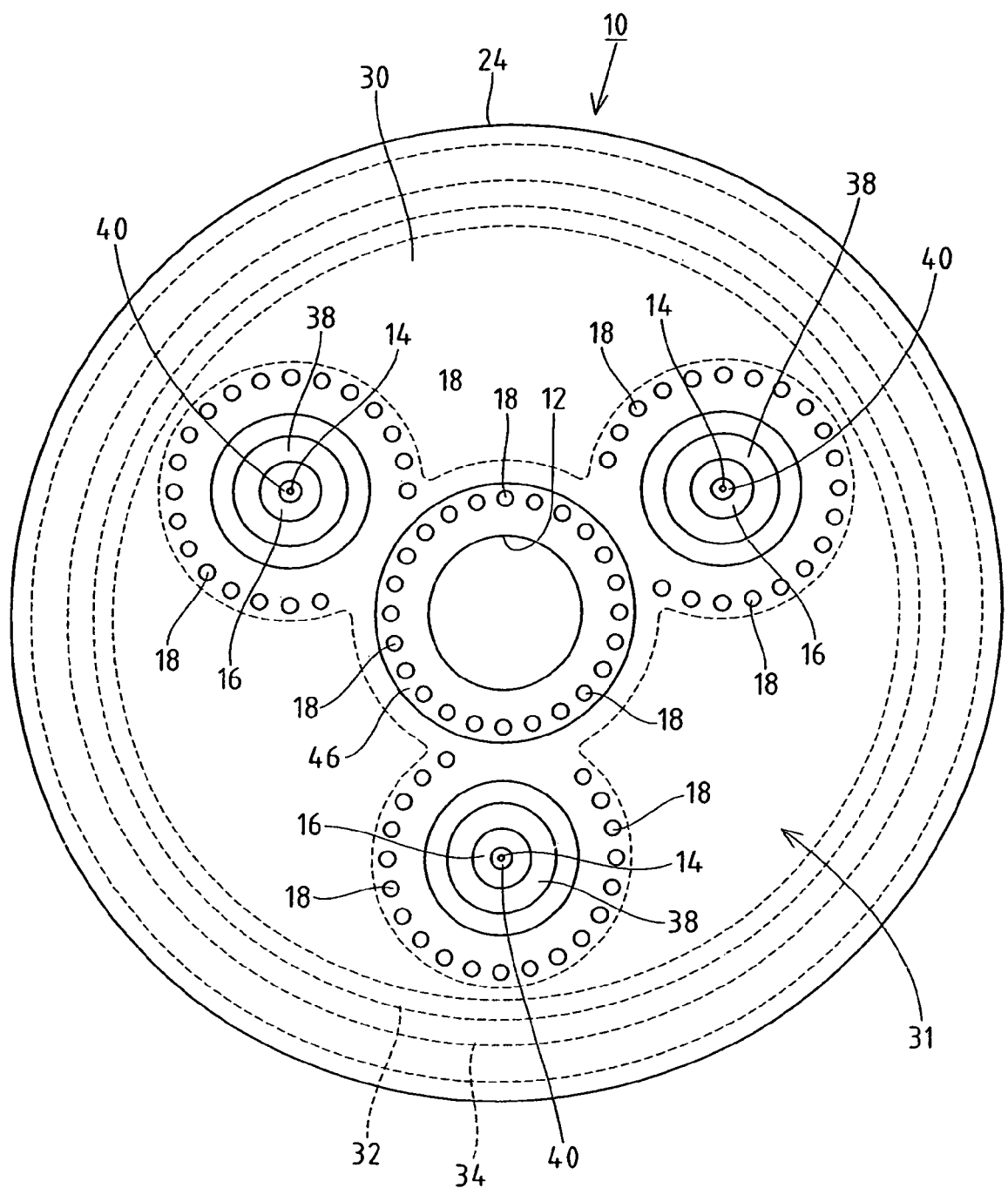
FIG. 1 is a powder body melting burner according to a preferable embodiment of the present invention and shows a front view of the burner head thereof.
Figure 2:
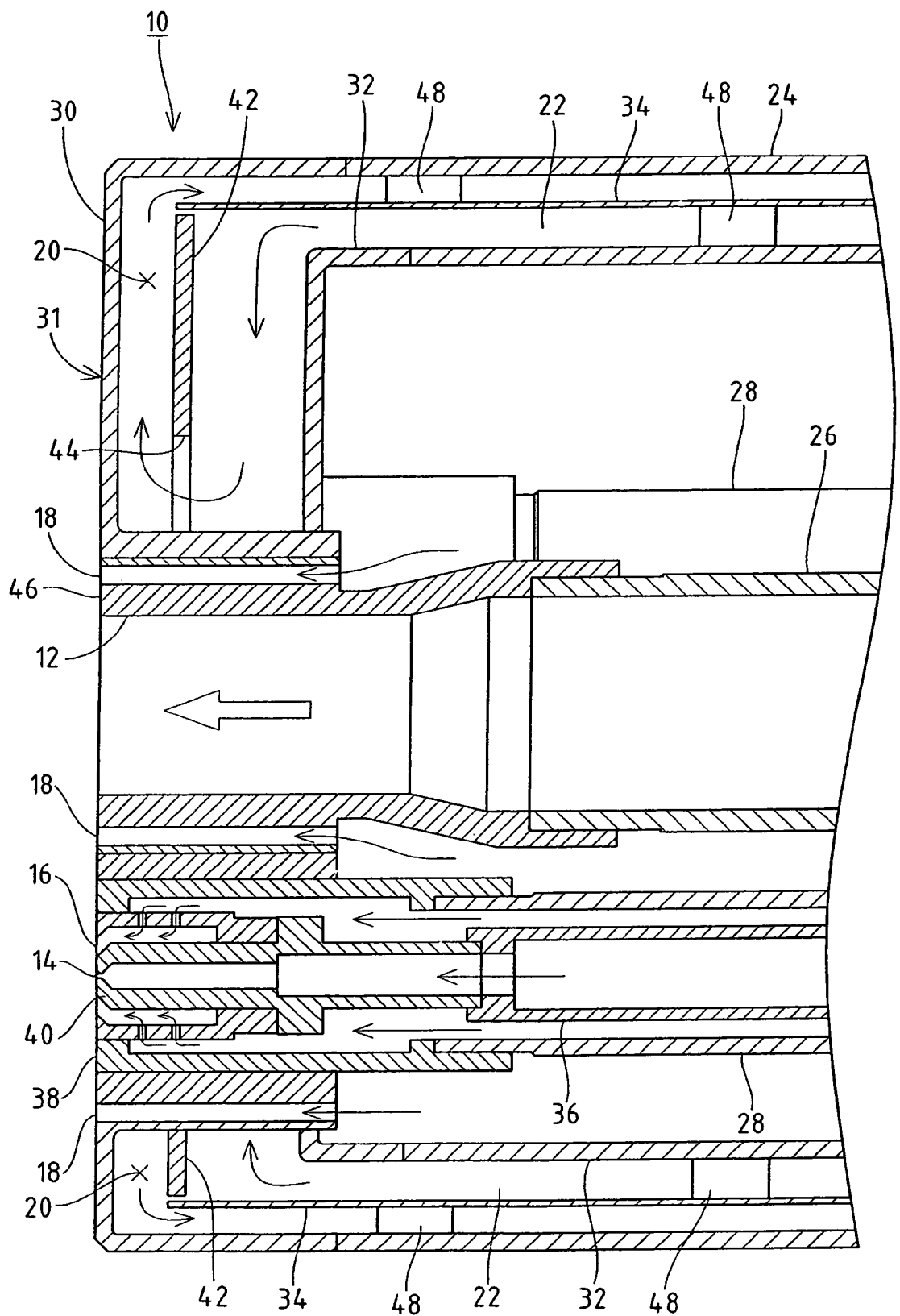
FIG. 2 is a longitudinal sectional view of the powder body melting burner of FIG. 1.
Figure 3:
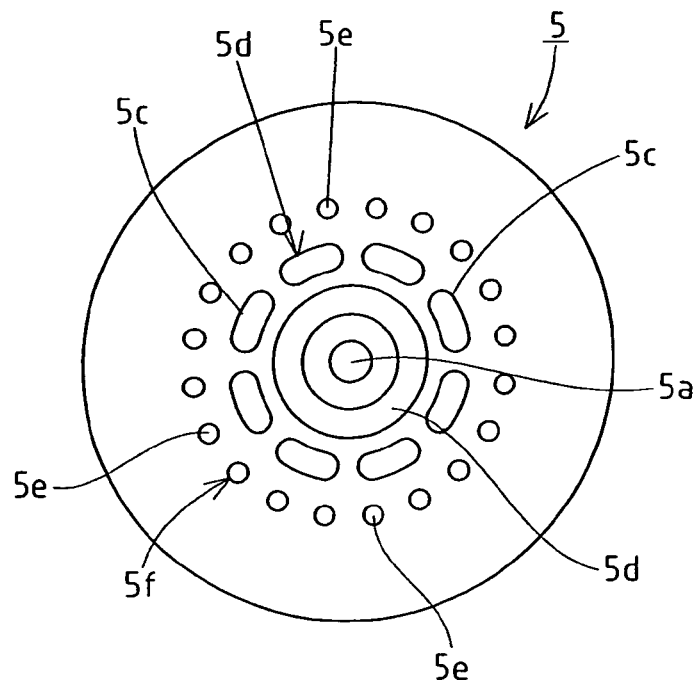
FIG. 3 is a front view of a burner head in a powder body melting burner of the conventional art.
Figure 4:
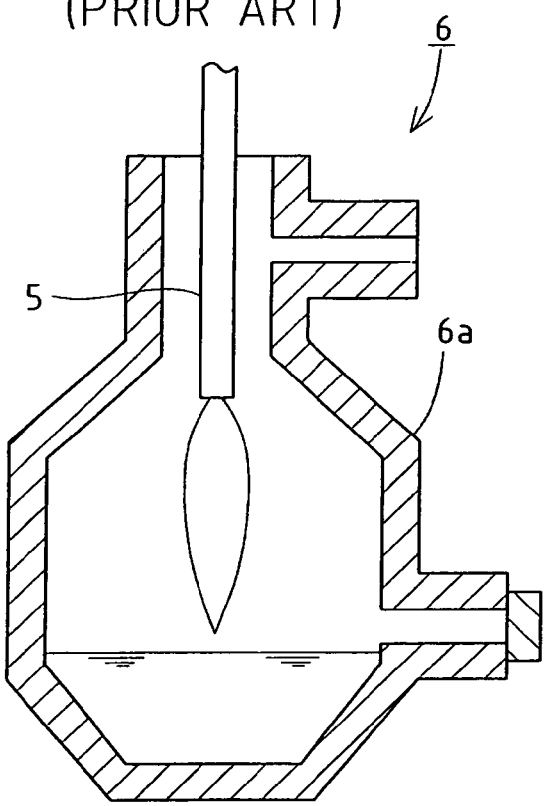
FIG. 4 is a schematic cross-sectional view in the case where the powder body melting burner is used for a melting furnace.

FIG. 1 shows a burner head 30 viewed from the front of a powder body melting burner 10 according to the embodiment, and FIG. 2 is a cross-sectional view traveled down through the powder body melting burner 10 in the axis direction. The powder body melting burner 10 is cylindrical as a whole, forms a cylinder body with a required length, and is inserted into the furnace body at right angles, thereby causing the burner head 30 to direct to the bottom of the furnace, as described with respect to FIG. 4.

(Configuration of the Burner Head)

The burner head 30 has a powder body injection hole 12 with a required diameter, as a single body, opened at the center thereof, and the powder body is pumped together with air to be inject-supplied into the furnace through a powder body supply pipe 26 as will be described later. As for the pore size of the powder body injection hole 12, the dimensions thereof will be set so that the powder body can be supplied most efficiently per a unit of time according to the melting ability of the powder body and the capacity of the furnace body. Moreover, the inner face of the powder body injection hole 12 is coated with a refractory and wear resistant lamination so as to withstand the wear out due to the sliding friction as the powder body passes.

In the burner head 30, three fuel injection holes 14 are provided in the radial direction with the central angle of 120 degrees centering on the powder body injection hole 12, and this fuel injection hole 14 inject-supplies heavy oils into the furnace under pressure through a fuel injection nozzle 40 and a fuel supply pipe 36 as will be described later. In this embodiment, although there are provided three fuel injection holes with the equal angle of 120 degrees centering on the powder body injection hole 12, the arrangement number and the arrangement angle are the design matters, and a suitable arrangement will be employed depending on the actual design. Moreover, the clearance of the individual fuel injection hole 14 relative to the powder body injection hole 12 is also a pure and simple design matter and a suitable value will be selected in a specific design phase.

Moreover, in the periphery of the fuel injection hole 14 in the burner head 30, a single primary oxygen injection hole 16 for inject-supplying the primary oxygen is provided, accordingly. To this primary oxygen injection hole 16, the primary oxygen is supplied as a combustion assisting gas, under pressure, through a primary oxygen nozzle 38 and a primary oxygen supply pipe 28, as will be described later.

Furthermore, a number of holes are opened with a required interval so as to enclose each of the powder body injection holes 12 and the fuel injection holes 14 in the burner head 30, and these holes configure, as a whole, an annular secondary oxygen injection hole 18 with respect to each of the powder body injection holes 12 and the fuel injection holes 14. To this secondary oxygen injection hole 18, the secondary oxygen is supplied as a combustion assisting gas through a secondary oxygen supply pipe 32 as will be described later.

(Overall Configuration of the Burner)

In FIG. 2, the powder body melting burner 10 is based on a burner body 24 that forms a long and hollow cylinder shape, and the burner head 30 forms one end face portion of the burner body 24. Inside the cylinder body of the burner body 24, a secondary oxygen supply pipe 32 that forms the cylinder body, whose diameter is smaller than that of the burner body 24, is concentrically inserted therein to extend in the axis direction, and one end portion on the burner head side is connected to the secondary oxygen injection hole 18 as will be described later, and the other end portion is connected to the secondary oxygen pumping source (not shown).

Between the burner body 24 and the secondary oxygen supply pipe 32, a cylindrical partition wall 34 is insert-supported via a spacer 48 to configure a cooling jacket 22, and to this cooling jacket 22 a liquid cooling medium, for example, water is supplied cyclically.

In FIG. 2, a cylindrical secondary oxygen supply block 46 is embedded in the center of the burner head 30, and the powder body injection hole 12 is opened at the center of this secondary oxygen supply block 46. Moreover, in the secondary oxygen supply block 46 a number of secondary oxygen injection holes 18 are made in the radial direction and in the circumferential direction with a predetermined interval centering on the powder body injection hole 12, and these secondary oxygen injection holes 18 form, as a whole, an annular column surrounding the powder body injection hole 12. The backside of the powder body injection hole 12 is continuously connected to the powder body supply pipe 26 that extends in the axis direction inside the burner body 24, and this powder body supply pipe 26 is connected to the powder body pumping source (not shown).

Because the secondary oxygen injection holes 18, which have been made as the circular column in large numbers in the secondary oxygen supply block 46, are in communication with the secondary oxygen supply pipe 32 inside the burner body 24, the secondary oxygen is supplied from these secondary oxygen injection holes 18, in the form of enclosing the powder body to be supplied from the powder body injection hole 12.

(Fuel Injection Section)

In the burner head 30, each of the three fuel injection holes 14 provided with the central angle of 120 degrees centering on the powder body injection hole 12 is made on the top of the fuel injection nozzle 40 shown in FIG. 2. Moreover, in the burner head 30, the top of the hollow cylindrical primary oxygen nozzle 38 faces to the periphery which is concentric with the fuel injection nozzle 40. Namely, as shown in FIG. 2, inside the secondary oxygen supply pipe 32, three primary oxygen supply pipes 28 extend to the axis direction, respectively, with the central angle of 120 degrees centering on the powder body supply pipe 26.

In this primary oxygen supply pipe 28, the front end thereof is connected to the primary oxygen nozzle 38 and supplies the primary oxygen as the assisting gas from the periphery of the fuel injection nozzle 40, and the other end is connected to the primary oxygen pumping source (not shown). Furthermore, inside the primary oxygen supply pipe 28 the fuel supply pipe 36 is inserted coaxially to extend, and the front end thereof is connected to the fuel injection nozzle 40, and the back end is connected to the fuel (heavy oils) pumping source (not shown).

Moreover, as shown in FIG. 1, in the burner head 30 a number of secondary oxygen injection holes 18 are made to enclose each of the three fuel injection holes 14 and the primary oxygen injection hole 16, thereby forming a circular column as a whole. Because these secondary oxygen injection holes 18 are opened in the secondary oxygen supply pipe 32 on the back side of the burner head 30 as shown in FIG. 2, the secondary oxygen is injected also from these secondary oxygen injection holes to further enclose the heavy oils injected from the fuel injection hole 14 and the primary oxygen injected from the first oxygen injection hole 16.

(Cooling Chamber)

As shown in FIG. 2, on the back side of the burner head 30 and in the region in which a plurality of the fuel injection holes 14 are provided, a partition plate 42 is provided to define a cooling chamber 20 therein. In the center of this partition plate 42, a circulation hole 44 for the cooling water is opened, and the cooling water from the cooling jacket 22 is supplied cyclically to the cooling chamber 20 through the circulation hole 44, and accordingly there is an advantage that not only the external cylinder region of the burner 10 but also a plane portion 31 of the burner head 30 can be cooled actively.

Namely, in the periphery of the powder body injection hole 12, the fuel injection hole 14, the primary oxygen injection hole 16, and the secondary oxygen injection hole 18 in the burner head 30, the air and oxygen that flow at high speed through these holes become the cooling medium (air cooling), thereby carrying out a suitable cooling. However, because the effect by the air cooling may not reach the plane portion 31 region in the burner head 30, the region being apart from these holes, it becomes at extremely high temperatures unless being cooled by water, and invites an increase of the thermal expansion or thermal stress, thereby resulting in burnout of the burner in many cases, with this region being as the starting point. Accordingly, cooling the plane portion 31 of the burner head 30 actively by means of water circulation as described above can improve the life of the burner remarkably while preventing the burnout of the burner.

According to the powder body melting burner 10 of the embodiment, the powder body is injected from the powder body injection hole 12 to be opened at the center of the burner head 30, and heavy oils are inject-supplied from the three fuel injection holes 14 positioned outward in the radial direction centering on the powder body injection hole 12 of the burner head 30, respectively. Moreover, from the primary oxygen injection hole 16 provided concentrically with the fuel injection hole 14, the primary oxygen is also inject-supplied. In this case, while a bundle of discharging flow of the three heavy oils encloses the surrounding of the powder body to be injected from the powder body injection hole 12, the secondary oxygen injected from the secondary oxygen injection hole 18 encloses the surrounding of the powder body and the surrounding of the heavy oils.

For this reason, when igniting the heavy oils, the powder body will be in the form of being confined in the central part of high temperature flames which are combustion-supported by the primary oxygen and the secondary oxygen, and it is therefore possible to significantly reduce the carry-over phenomenon that the powder body concerned is spewed out from the flames to the outside. Moreover, because the back side of the burner head 30 is cooled with a liquid that passes through the cooling chamber 20, not only the external cylinder portion of the burner but also the plane portion 31 of the burner head 30 will be cooled consequently, and therefore the durable life of the powder body melting burner 10 can be extended.

One example of the powder body to be treated with the powder body melting burner according to the present invention includes an electric furnace dust, a reducing slag, a burned ash, or the like to be a slag after having been melted. Moreover, another example includes a powder-granular waste plastic, shredder dust, carbonized sludge, or the like to be gasified by combustion. Furthermore, another example includes a powder-granular iron ore, nickel ore, copper ore, molybdenite stone, or the like which exists as a metal oxide, a metal sulfide, a metal hydroxide, a metal carbonation or the like, and which serves as metal by separating the oxygen, sulfur, hydroxyl radical, carbonic acid radical, or the like. Namely, the powder body to be melting-treated suitably with the powder body melting burner according to the present invention includes a metal oxide, a metal sulfide, a metal hydroxide, a metal carbonation, and the complex body thereof.

Furthermore, the furnace body, in which the powder body melting burner of the present invention is used suitably, includes a melting treatment furnace in which, for example, powder particles or the like made by crushing an electric furnace dust, a reducing slag, a burned ash or other plastic waste are melted in high temperature flames, which is recovered as a molten slag in the furnace. Moreover, another furnace body includes a melting reduction furnace in which, for example, a granular metal oxide, metal sulfide or the like are melted in high temperature flames and at the same time the oxygen, sulfur, or the like are separated and recovered as a molten metal in the furnace.

While supplying the powder body from the center of the burner head, the fuel is supplied from a plurality of places in the outside of the powder body, and thereby the powder body immediately after having been inject-supplied into the furnace is in the state that the surrounding thereof is enclosed with the fuel. Therefore, the powder body is prevented from escaping from flames, and thus the operation loss can be reduced.

Moreover, because the fuel is not inject-supplied into the furnace from one place of the burner head, but is inject-supplied from a plurality of places and burned, the length of each of the flames becomes short by necessity, and accordingly, the height of the furnace body also can be designed to be short, thereby allowing the manufacturing cost to be suppressed. Furthermore, in the case where the furnace of the same height is used, because the length of flames becomes short, the flames will not reach the peripheral furnace wall, and thus, there is an advantage that the wear out of the refractory materials of the furnace-wall can be alleviated.

What is claimed is:

1. A powder body melting burner which injects a powder body, fuel, and oxygen into a furnace individually from a burner head and melts the powder body in flames in which the fuel is burned under oxygen support, the powder body melting burner comprising:

a single powder body injection hole provided in the center of the injection head;

a plurality of fuel injection holes disposed with a required central angle in the radial direction centering on the powder body injection hole;

a single primary oxygen injection hole provided concentrically with each of the plurality of fuel injection holes; and a plurality of secondary oxygen injection hole provided in large numbers with a predetermined interval so as to surround each of the powder body injection hole and the plurality of fuel injection holes, the plurality of secondary oxygen in injection holes forming a ring shape as a whole around each of said powder body injection hole and said plurality of fuel injection hole; and wherein a cooling chamber is provided in the back side of the burner head and in a region from an outer circumference of the burner head to areas near the plurality of secondary oxygen injection holes, and a coolant from a cooling jacket arranged in the periphery of a burner body is supplied cyclically to the cooling chamber, thereby cooling a plane section of the burner head from the outer circumference thereof to said areas near said plurality of secondary oxygen injection holes.

2. The powder body melting burner according to claim 1, wherein a plurality of fuel injection holes are provided with a central angle of about 120 degrees in the radial direction centered on the powder body injection hole.

3. The powder body melting burner according to claim 1, wherein the plurality of fuel injection holes are provided three in number which are circumferentially equally spaced centered about the powder body injection hole.

* * * * *